US008885213B2

(12) United States Patent
Yokoyama et al.

(10) Patent No.: US 8,885,213 B2
(45) Date of Patent: Nov. 11, 2014

(54) IMAGING FORMING APPARATUS

(75) Inventors: Takuhei Yokoyama, Osaka (JP); Tatsuya Miyadera, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 337 days.

(21) Appl. No.: 13/157,427

(22) Filed: Jun. 10, 2011

(65) Prior Publication Data

US 2011/0304867 A1 Dec. 15, 2011

(30) Foreign Application Priority Data

Jun. 15, 2010 (JP) ................................ 2010-136431

(51) Int. Cl.

| | |
|---|---|
| ***H04N 1/60*** | (2006.01) |
| ***G03G 15/00*** | (2006.01) |
| ***G03G 15/02*** | (2006.01) |
| ***G03G 15/01*** | (2006.01) |

(52) U.S. Cl.

CPC ........ *G03G 15/5041* (2013.01); *G03G 15/0266* (2013.01); *G03G 15/011* (2013.01); *G03G 15/5058* (2013.01); *G03G 2215/00042* (2013.01)

USPC ........... 358/1.9; 358/1.2; 358/3.01; 358/3.02; 358/3.24; 358/520; 358/521

(58) Field of Classification Search

CPC ..... G03G 15/06; G03G 15/065; G03G 15/08; G03G 15/0824; G03G 15/0825; G03G 15/0827; G03G 15/0831; G03G 15/011; G03G 15/0115; H04N 1/40043; H04N 1/0432; H04N 1/0443

USPC ........ 358/1.9, 3.26, 1.13–1.14, 504, 518–523

See application file for complete search history.

(56) References Cited

U.S. PATENT DOCUMENTS

| | | | | |
|---|---|---|---|---|
| 4,780,768 | A * | 10/1988 | Tomohisa et al. | 358/3.07 |
| 5,359,431 | A * | 10/1994 | Ng | 358/3.01 |
| 5,805,192 | A | 9/1998 | Sasaki et al. | |
| 6,130,700 | A * | 10/2000 | Murayama et al. | 347/240 |
| 6,288,733 | B1 * | 9/2001 | Nakazawa et al. | 347/133 |
| 6,452,696 | B1 * | 9/2002 | Bogart et al. | 358/1.9 |
| 7,441,855 | B2 * | 10/2008 | Takahashi et al. | 347/15 |
| 7,881,628 | B2 * | 2/2011 | Itagaki | 399/49 |
| 2002/0071132 | A1 * | 6/2002 | Yamada et al. | 358/1.9 |
| 2002/0101501 | A1 * | 8/2002 | Miyagawa | 347/238 |
| 2005/0007609 | A1 * | 1/2005 | Itagaki et al. | 358/1.9 |
| 2008/0025741 | A1 * | 1/2008 | Yamashita et al. | 399/49 |
| 2009/0176171 | A1 * | 7/2009 | Ogawa et al. | 430/120.1 |

(Continued)

FOREIGN PATENT DOCUMENTS

| | | | |
|---|---|---|---|
| CN | 101651768 | A | 2/2010 |
| JP | 06-110286 | A | 4/1994 |

(Continued)

*Primary Examiner* — Richard Zhu

(74) *Attorney, Agent, or Firm* — Dickstein Shapiro LLP

(57) ABSTRACT

An image forming apparatus for forming images at a plurality of resolution levels including at least one low resolution level and one high resolution level includes a photoconductor, onto which a beam size is set for the low resolution level; and an adjustment unit to conduct an exposure time-based density adjustment using a plurality of half-tone patterns prepared by changing an exposure time per pixel at a timing when a resolution level shifts from the low resolution level to the high resolution level and before actually shifting to an image forming operation executed at the high resolution level.

10 Claims, 9 Drawing Sheets

(56) References Cited

U.S. PATENT DOCUMENTS

| | | | | |
|---|---|---|---|---|
| 2009/0180789 | A1 | 7/2009 | Itagaki | |
| 2009/0273813 | A1* | 11/2009 | Viturro et al. | 358/3.26 |
| 2010/0039672 | A1 | 2/2010 | Kashibuchi et al. | |
| 2010/0111550 | A1* | 5/2010 | Kubo | 399/50 |

FOREIGN PATENT DOCUMENTS

| | | | |
|---|---|---|---|
| JP | 9-141934 | A | 6/1997 |
| JP | 2003-231307 | A | 8/2003 |
| JP | 2008-83252 | A | 4/2008 |
| JP | 2009-223215 | A | 10/2009 |

* cited by examiner

DATA 2 FOR CONTROL PROCESS

FIG. 7

DATA 3 FOR CONTROL PROCESS (a)

CURRENT RESOLUTION MANAGEMENT DATA

| |
|---|
| CURRENT RESOLUTION: 600dpi |

(b)

PRINT JOB MANAGEMENT CUE

| | |
|---|---|
| PRINT JOB #4 | PRINT DATA: doc 4<br>NUMBER OF PRINT SHEETS: 12<br>RESOLUTION: 1200dpi |
| PRINT JOB #5 | PRINT DATA: doc 5<br>NUMBER OF PRINT SHEETS: 25<br>RESOLUTION: 600dpi |
| ⋮ | |

(c)

IMAGE FORMING CONDITION ADJUSTMENT PREDICTION CUE

| |
|---|
| PREDICTED START TIMING OF IMAGE FORMING CONDITION ADJUSTMENT: DURING PRINT JOB #5 |
| ⋮ |

DATA 4 FOR CONTROL PROCESS

IMAGING FORMING APPARATUS

CROSS-REFERENCE TO RELATED APPLICATIONS

This application claims priority to Japanese Patent Application No. 2010-136431, filed on Jun. 15, 2010 in the Japan Patent Office, which is incorporated by reference herein in its entirety.

BACKGROUND OF THE INVENTION

1. Field of the Invention

The present invention relates to an image forming apparatus, and more particularly, to an image forming apparatus capable of adjusting image density of a formed image.

2. Description of the Background Art

Image forming apparatuses typically include an image forming condition control unit to adjust charge bias, development bias, and beam power to a suitable level. The charge bias is applied to a surface of an image bearing member such as a photoconductor drum by a charger. The development bias is an electric potential applied to a development agent supply unit such as a development roller by a development unit. The beam power is a light intensity of light output from an optical writing unit.

The process of adjusting the biases and beam power is generally accomplished by reading a test pattern formed on an image bearing member or the like. With such adjustment process, the image forming operation can be conducted with a given constant image density even if image forming conditions change due to such factors as ambient temperature and humidity during the image forming operation, toner deterioration, photoconductor deterioration, or the like.

The density adjustment process may be conducted as follows. In a case in which the charge bias is fixed at a given value, solid test patterns or solid patterns are formed using a plurality of development biases, change in solid pattern density with respect to the development biases is detected, and a development bias for a suitable density is then set. If the beam power used for forming such solid patterns is such that a surface potential of a latent image of the solid pattern formed on a photoconductor is saturated, the density adjustment can be conducted without problems.

Further, the beam spot diameter in a sub-scanning direction on the photoconductor needs to be set greater than the size of one pixel of a to-be-formed latent image so that a blank area does not occur in the sub-scanning direction of latent image. When the solid pattern is formed using such beam spot diameter, the latent image has a portion in which two pixels overlap, in which the solid pattern saturating the surface potential of the photoconductor can be easily formed using a given beam power.

Then, under the thus-determined development bias, half-tone test patterns or half-tone patterns are formed using a plurality of beam powers, change in half-tone pattern density with respect to the beam power is detected, and a beam power for suitable density of half-tone pattern is then determined. Because the half-tone pattern has fewer overlapping portions on a given latent image, the beam power that can provide a suitable density for half-tone pattern becomes greater than the beam power that forms the solid pattern on the photoconductor that can saturate the surface potential of the photoconductor. If the charge bias is fixed at a suitable level, an image can be formed with a suitable density by conducting the above-described density setting process using the solid pattern and half-tone pattern in the above-described order.

By contrast, in a case in the development bias is fixed at a given value, solid patterns are formed using a plurality of charge biases, change in solid pattern density with respect to the charge bias is detected, and a suitable charge bias is then determined. The subsequent processes are similar to the above-described case in which the charge bias is fixed at a give value.

Further, instead of fixing the charge bias or development bias alone, solid patterns can be formed by setting a plurality of combinations of charge and development biases to select a combination suitable for optimum image density from the plurality of combinations. Further, solid patterns and/or half-tone patterns can be formed using a plurality of combinations of charge bias, development bias, and beam power to select a combination suitable for optimum image density from the plurality of combinations.

It is desirable that image forming apparatuses have a plurality of resolution levels such as, for example, 600 dpi (dots per inch) and 1200 dpi, and such image forming apparatuses having a plurality of resolution levels are already commercially available.

However, conventional image forming apparatuses adapted for a plurality of resolution levels may employ a mechanism or system adapted to a higher resolution level (for example, 1200 dpi when 600 dpi and 1200 dpi are available) among a plurality of resolution levels, by which both the size and the cost of the apparatus increases. Specifically, a larger and more precise optical system is required when it is necessary to set the beam spot diameter on a photoconductor with a higher resolution level compared to an optical system using the beam spot diameter of a lower resolution level. Further, the above described density adjustment conducted for the high resolution level may be also applied to the low resolution level.

Accordingly, to reduce cost, it may be preferable to use a mechanism adapted to a low resolution level, but problems may occur as follows.

For example, if the mechanism is adapted for the low resolution level, the beam spot diameter may become too large when writing one pixel with the high resolution level, by which the image may be blurred or clogged. Such problem can be reduced by conducting a density adjustment.

In general, the light intensity of light beam has its peak at the center of light beam, and the light intensity decreases the farther from the center of light beam. Accordingly, the beam spot diameter is set substantially smaller when conducting the density adjustment to prevent a blurred or clogged image and enable the image to be formed with the high resolution level.

Specifically, when the density adjustment is conducted, a beam power is set smaller or a charge bias is increased to reduce the amount of development agent adhering to the to-be-formed half-tone pattern, by which a blurred or clogged image can be prevented. When the solid pattern is formed, such blurred or clogged image may not become a problem, because the image forming pattern of solid pattern can be formed in the same manner for both the low and high resolution levels.

However, if the beam spot diameter on the photoconductor is adjusted for the low resolution level and the beam power is adjusted to a smaller value, the image forming operation at the high resolution level may require a greater range for light intensity of beam power compared to the image forming operation at the low resolution level, by which a high-power light source may be required. Further, the high-power light source may induce a lower precision when a given light intensity is set. Accordingly, the high-power light source which can set a light intensity with a high precision may be required, but such light source may increase the apparatus cost. Further, if the charge bias is increased, the potential difference between the charge bias and the development bias increases, by which fogging may more likely occur.

Accordingly, if a conventional density adjustment is conducted, the adjustment may not be conducted effectively while the image patterns are formed meaninglessly, and thereby the development agent may be wasted and the adjustment process may become useless.

JP-2009-223215-A may not disclose a method of shifting the resolution level from low to high resolution in an image forming apparatus adapted for using a plurality of resolution levels, by which the above described problems may not be cured.

SUMMARY

In one aspect of the present invention, an image forming apparatus for forming images at a plurality of resolution levels including at least one low resolution level and one high resolution level is devised. The image forming apparatus includes a photoconductor, onto which a beam size is set for the low resolution level; and an adjustment unit to conduct an exposure time-based density adjustment using a plurality of half-tone patterns prepared by changing an exposure time per pixel at a timing when a resolution level shifts from the low resolution level to the high resolution level and before actually shifting to an image forming operation executed at the high resolution level.

In another aspect of the present invention, a method of controlling an image forming operation of an image forming apparatus for forming images at a plurality of resolution levels including at least one low resolution level and one high resolution level is devised while a beam size on a photoconductor being set for the low resolution level. The method includes the steps of: preparing a plurality of half-tone patterns by changing an exposure time per pixel at a timing when a resolution level shifts from the low resolution level to the high resolution level and before actually shifting to an image forming operation of the high resolution level; and conducting an exposure time-based density adjustment using the plurality of half-tone patterns.

In another aspect of the present invention, a computer-readable medium storing a program is devised. The program includes instructions that when executed by a computer cause the computer to execute a method of controlling an image forming operation of an image forming apparatus for forming images at a plurality of resolution levels including at least one low resolution level and one high resolution level while a beam size on a photoconductor being set for the low resolution level. The method includes the steps of: preparing a plurality of half-tone patterns by changing an exposure time per pixel at a timing when a resolution level shifts from the low resolution level to the high resolution level and before actually shifting to an image forming operation of the high resolution level; and conducting an exposure time-based density adjustment using the plurality of half-tone patterns.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 7(*a*), 7(*b*), and 7(*c*) show one example of data used for control process;

Figure 1:
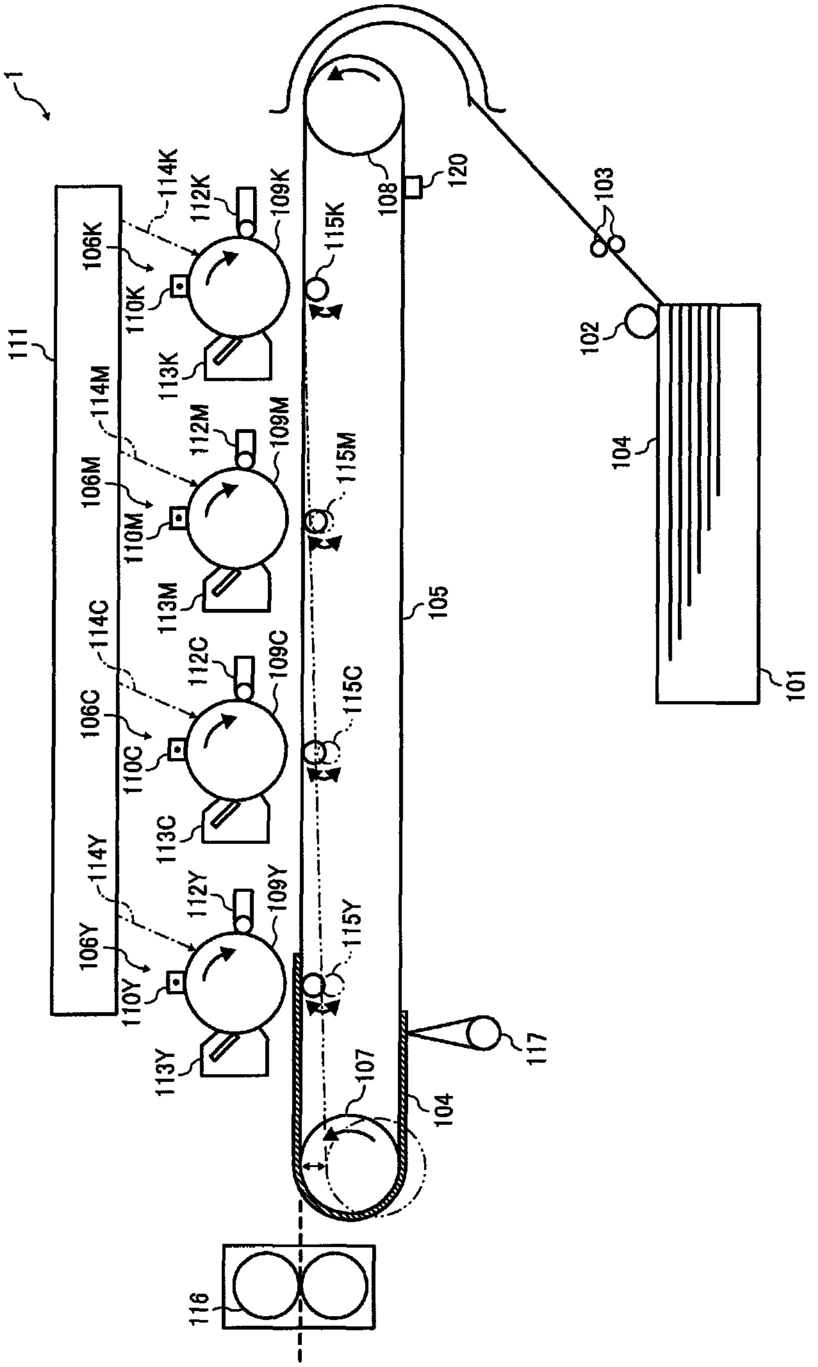
FIG. 1 shows an example mechanical configuration of an image forming apparatus according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner. Referring now to the drawings, an image forming apparatus according to example embodiment is described hereinafter.

<Configuration and Operation>

FIG. 1 shows an example mechanical configuration of an image forming apparatus 1 according to an example embodiment. For example, the image forming apparatus 1 may be a tandem type which arranges image forming units for each of colors along a transport belt used as an endlessly moving unit.

As shown in FIG. 1, a plurality of image forming units 106 (used as electrophotography process unit) such as the image forming units 106K, 106M, 106C, 106Y) are arranged along a transport belt 105 from the upstream to downstream of moving direction the transport belt 105. A sheet 104 used as recording medium separated and fed from a sheet feed tray 101 using a sheet feed roller 102 and a separation roller 103 is transported on the transport belt 105.

Each of the plurality of the image forming units 106 has a same internal configuration except the colors of toner used for forming an image. The image forming unit 106K forms black image, the image forming unit 106M forms magenta image, the image forming unit 106C forms cyan image, and the image forming unit 106Y forms yellow image. Accordingly, in the following description, the image forming unit 106K is described as the representative of the image forming units 106K 106M, 106C, 106Y. The suffixes "K, M, C, Y" may be attached to each units composing the image forming units 106K, 106M, 106C, 106Y in the drawings as required.

The transport belt 105, used as an endless belt or endlessly moving unit, is extended by a drive roller 107 and a driven roller 108. The transport belt 105 can be rotated by driving the drive roller 107, and the drive roller 107 is driven by a drive motor. The drive motor, the drive roller 107, and the driven roller 108 function as a drive unit to move the transport belt 105.

When an image forming operation is conducted, the sheet 104 stored in the sheet feed tray 101 is fed from the most top sheet stored in the sheet feed tray 101. The sheet 104 can be adsorbed on the transport belt 105 with the electrostatic adsorption effect. The transport belt 105 rotating in a given direction transports the sheet 104 to the first image forming unit such as image forming unit 106K, and then a black toner image is transferred onto to the sheet 104 from the image forming unit 106K.

The image forming unit 106K includes a photoconductor 109K used as an image bearing member, a charger 110K, a development unit 112K, a photoconductor cleaner, and a de-charger 113K, disposed around the photoconductor 109K. An optical writing unit 111 is configured to emit laser beam 114 such as 114K, 114M, 114C, 114Y.

When an image forming operation is conducted, the charger 110K uniformly charges the surface of the photoconductor 109K in a dark environment, and then the optical writing unit 111 emits the laser beam 114K to irradiate the surface of the photoconductor 109K to write and form an electrostatic latent image for black image. The development unit 112K develops the electrostatic latent image using black toner, by which a black toner image is formed on the photoconductor 109K.

The black toner image is transferred from the photoconductor 109K to the sheet 104 using a transfer unit 115K at a position (or transfer position) that the photoconductor 109K and the sheet 104 on the transport belt 105 contact each other. With such a transfer process, the black toner image is formed on the sheet 104. After transferring the black toner, the photoconductor cleaner removes toner remaining on the photoconductor 109K, and then the de-charger 113K de-charges the photoconductor 109K, by which the photoconductor 109K becomes ready for a next image forming operation.

The sheet 104 having the black toner image transferred at the image forming unit 106K is transported to a next image forming unit such as image forming unit 106M by the transport belt 105. As similar to the image forming process at the image forming unit 106K, a magenta toner image is formed on the photoconductor 109M in the image forming unit 106M, and the magenta toner image is transferred on the sheet 104 by superimposing the magenta toner image on the black toner image.

The sheet 104 is further transported to the next image forming units such as the image forming units 106C and 106Y, and as similar to the image forming process at the image forming unit 106M, a cyan toner image formed on the photoconductor 109 and a yellow toner image formed on the photoconductor 109Y by superimposing the cyan and yellow toner images on the magenta and black toner image, by which a full color image is formed on the sheet 104. The sheet 104 formed with the superimposed full color image is transported by the transport belt 105 to a fusing unit 116. After fusing the image at the fusing unit 116, the sheet 104 may be ejected outside of the image forming apparatus 1.

In such configured image forming apparatus 1, deterioration of toner and/or the photoconductor 109, and a change of image forming environment or condition may cause to change an amount of toner that adheres on the transport belt 105. Accordingly, it is required to measure the actual amount of toner that adheres on the transport belt 105 to adjust the image density.

The density adjustment may be conducted as follows. One or more of test patterns are formed as test images by changing at least one of the development bias applied to a development roller in the development unit 112, the charge bias applied to the photoconductor 109 by the charger 110, and the laser power of laser beam 114 emitted from the optical writing unit 111. A detector 117, disposed at the downstream side of the image forming unit 106Y, faces the transport belt 105 to measure the density of test patterns. Based on the measured density of test patterns, suitable charge bias, development bias, and laser power can be determined.

<Block Diagram and Operation of Control System>

Figure 2:
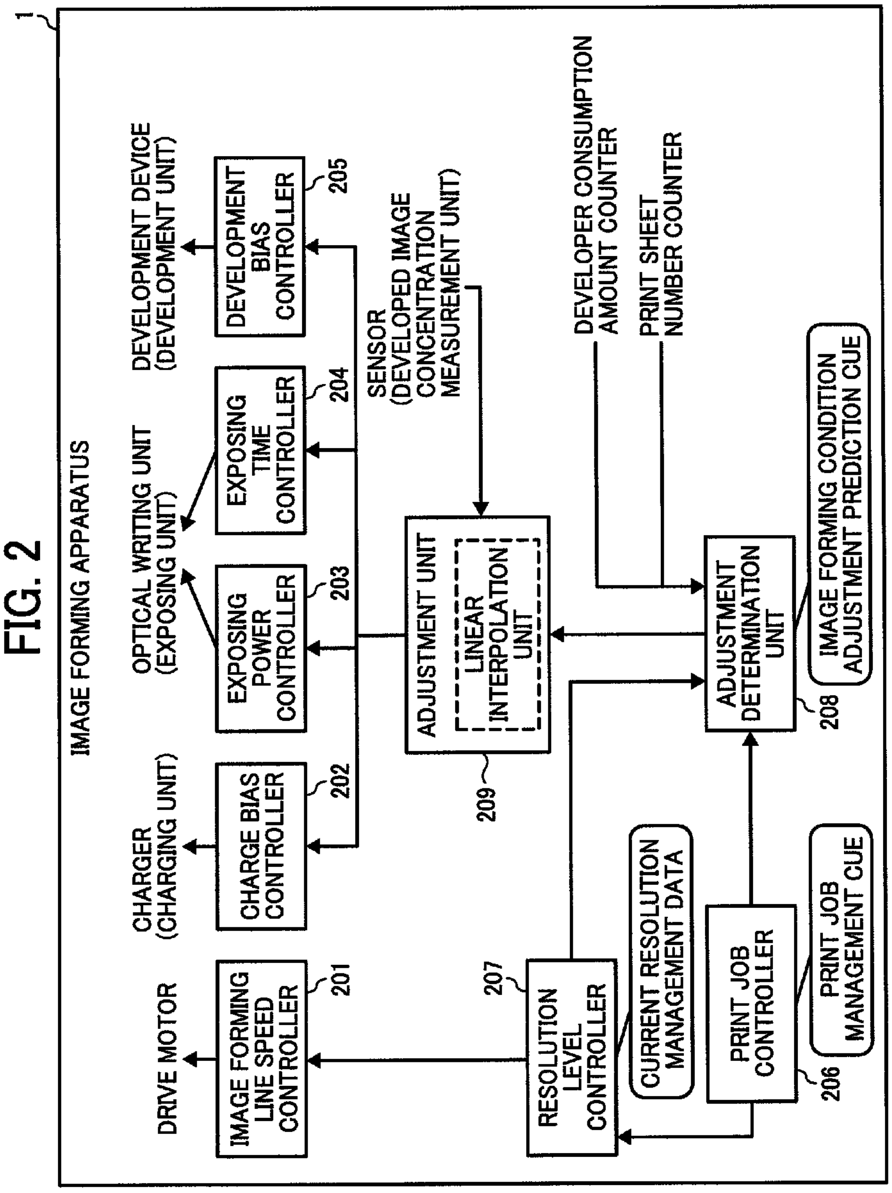
FIG. 2 shows an example control system of the image forming apparatus of FIG. 1.

FIG. 2 shows an example block diagram of a control system of the image forming apparatus 1.

As shown in FIG. 2, the control system of the image forming apparatus 1 may include an image forming line speed controller 201, a charge bias controller 202, an exposing power controller 203, an exposing time controller 204, a development bias controller 205, a print job controller 206, a resolution level controller 207, an adjustment determination unit 208, and an adjustment unit 209. Further, the control system of the image forming apparatus 1 can be implemented by executing a computer program on hardware resource of computer used for the image forming apparatus 1, such as for example a central processing unit (CPU), a read only memory (ROM), and a random access memory (RAM).

The image forming line speed controller 201 may control the speed of drive motor that drives the transport belt 105 (FIG. 1) in view of the resolution level. For example, when the image forming apparatus 1 is adapted for two resolution levels of 600 dots per inch (dpi) and 1200 dots per inch (dpi), the reference line speed may be set for 600 dpi, and then the line speed for 1200 dpi may be set one half (½) of the reference line speed.

The charge bias controller 202 controls the charge potential on the photoconductor 109 charged by the charger 110.

The exposing power controller 203 controls a beam power of laser beam 114 output by the optical writing unit 111.

The exposing time controller 204 controls exposure time in one pixel (exposure time per one pixel) of the laser beam 114 output by the optical writing unit 111 (FIG. 1). In this disclosure, the density adjustment by controlling the exposure time may be referred to as "exposure time-based density adjustment" which is distinguished from a conventional density adjustment referred to as "image forming condition adjustment."

The exposing time controller 204 may include an image edge detector to detect an image edge portion of one image line, written on a photoconductor, wherein the image edge portion may be detected as an edge signal for one image line written in an optical scanning direction. The exposing time controller 204 may apply the exposure time-based density adjustment only to the image edge portion.

Figure 3:
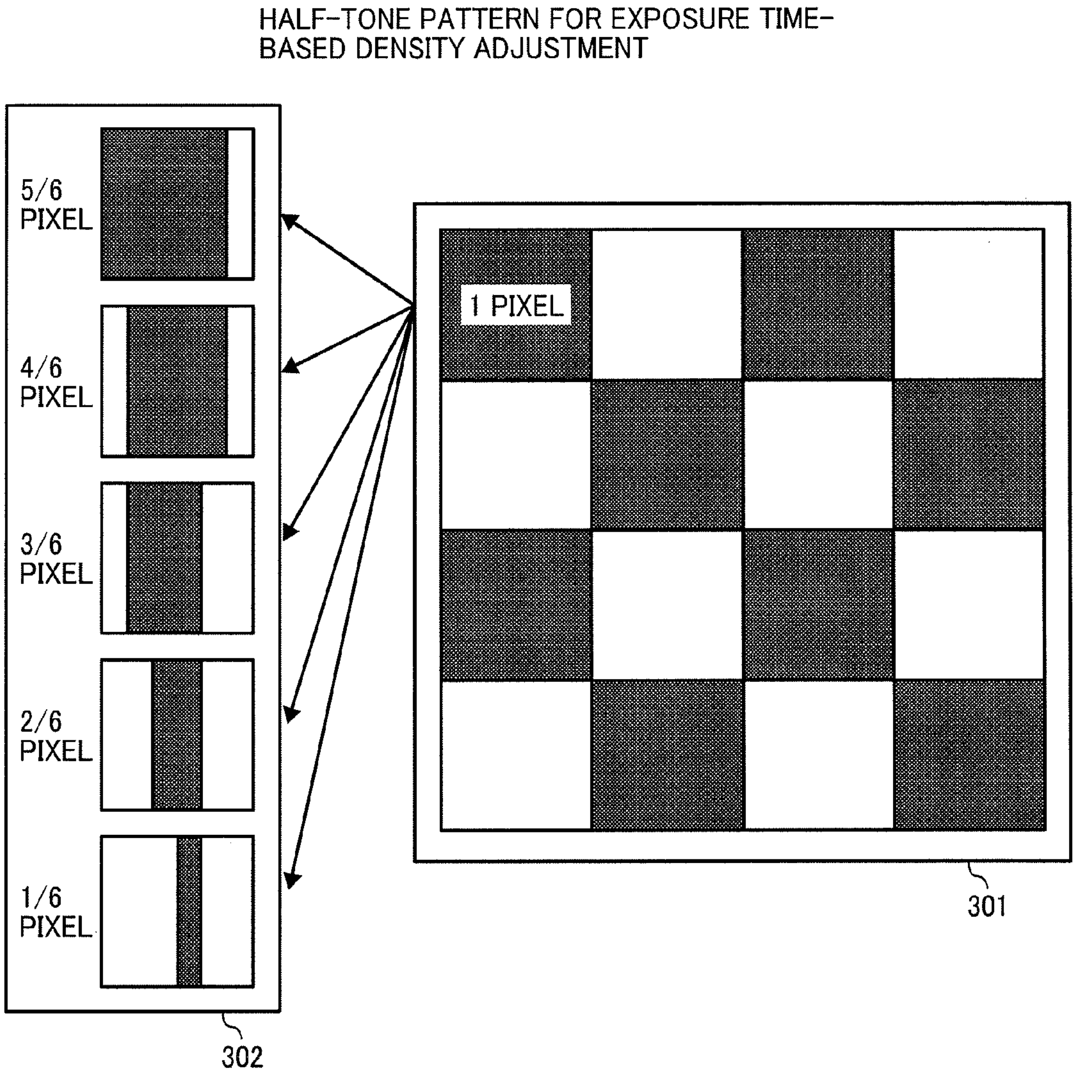
FIG. 3 shows an example half-tone pattern used for exposure time-based density adjustment.

FIG. 3 shows an example half-tone pattern 301 useable for the exposure time-based density adjustment. The forming of half-tone pattern 301 may be conducted by forming each pixel by changing the exposure time of each pixel. For example, each pixel may be formed as one pixel using the exposure time-based pattern 302 shown in FIG. 3. FIG. 3 shows an expanded view of the halftone pattern 301, in which an image may be formed by setting a given interval between pixels to form a gray scale image having solid areas and white areas.

If the beam spot diameter greater than one pixel is used for forming a half-tone image at a high resolution level, the image may be blurred or clogged and may become a solid image. Accordingly, the exposing time for one pixel of the halftone pattern 301 is set less than the exposing time, for whole one pixel (see exposure time-based pattern 302) to form a half-tone image, in which the half-tone image can be formed at a suitable density.

When each one pixel of the halftone pattern 301 is corresponded to one bit, the halftone pattern 301 can be expressed as bitmap image data composed of data string of "1" and "0" arranged one to another with a given order.

The exposure time-based pattern 302 may be expressed with index data defining the light-emission-stop timing and light-emission-activation timing in advance, or can be expressed with a string of bit data composed of light-emission-stop bit data and light-emission-activation bit data, in which the light-emission-stop may be expressed as "0" and light-emission-activation may be expressed as "1". But data expression for the halftone pattern 301 and the exposure time-based pattern 302 is not limited thereto.

The partially exposed one pixel shown as the exposure time-based pattern 302 can be formed as follows.

⅚-exposed pixel: when one pixel is exposed for the five sixth of one pixel (⅚ pixel), the light-emission-activation may start from a start time of one pixel to a time corresponding to ⅚ time of one pixel from the start time, and light-emission-activation is stopped from the ⅚ time to the end of one pixel, or the light-emission-activation is stopped from a start time of one pixel to a time corresponding to ⅙ time of one pixel from the start time, and the light-emission-activation is conducted from ⅙ time to the end of one pixel.

⅙-exposed pixel: when one pixel is exposed for the one sixth of one pixel (⅙ pixel), the light-emission-activation may be stopped from a start time of one pixel to a time corresponding to 3/6 time of one pixel from the start time, and the light-emission-activation is conducted from 3/6 time for the time duration of ⅙ pixel, and then the light-emission-activation is stopped until the end of one pixel, or the light-emission-activation is stopped from a start time of one pixel to a time corresponding to 2/6 time of one pixel from the start time, and the light-emission-activation is conducted from 2/6 time for the time duration of ⅙ pixel, and then the light-emission-activation is stopped until the end of one pixel.

Further, although five patterns are shown as the exposure time-based pattern 302 in FIG. 3, the number of patterns is not limited thereto, provided that there are at least two patterns. The greater the number of patterns, the higher the adjustment precision but the larger the consumption amount of development agent. As for the actually formed image patterns, the density of the image can be measured by detecting the actually formed image patterns. As for image patterns not actually formed when forming the test patterns, the density of the image patterns can be determined by conducting linear interpolation of the data, obtained from the actually formed-image patterns measured or detected by the detector 117 (FIG. 1).

The development bias controller 205, shown in FIG. 2, controls a potential of the development roller of the development unit 112.

The print job controller 206 manages a concerned print job, such as to-be-executed print job, using a print job management cue. The print job management cue will be described in detail later.

The resolution level controller 207 manages a resolution level based on the resolution level of a to-be-started print job by the print job controller 206, or an instruction by a user, then the resolution level controller 207 instructs a control of the line speed to the image forming line speed controller 201 in view of the resolution level. The value of current resolution level may be managed by current resolution management data. The current resolution management data will be described in detail later.

The adjustment determination unit 208 determines or predicts a timing of adjusting the image forming condition, and manages the timing of adjusting the image forming condition by using an image forming condition adjustment prediction cue. Specifically, based on an output value of a developer consumption amount counter which can count the consumption amount of development agent, an output value of a print sheet number counter which can count the number of printed sheets, the current resolution level managed by the resolution level controller 207, and the print job information managed by the print job controller 206, the adjustment determination unit 208 manages the timing of adjusting the image forming condition by using an image forming condition adjustment prediction cue. The contents of image forming condition adjustment prediction cue may be maintained with a concerned print job provided with the print job management cue, and then stored in a memory or the like. The image forming condition adjustment prediction cue will be described in detail later.

Further, the adjustment determination unit 208 determines whether it is required to conduct at least any one of the image forming condition adjustment and the exposure time-based density adjustment. When the adjustment determination unit 208 determines that such adjustment is required to conduct, the adjustment determination unit 208 instructs the adjustment unit 209 to conduct the adjustment operation. Principally, the exposure time-based density adjustment may be conducted just before switching from the low resolution level to the high resolution level, but as will be described later, the timing of the exposure time-based density adjustment can be changed and conducted with the image forming condition adjustment. By conducting the exposure time-based density adjustment and the image forming condition adjustment at a substantially same timing, a total printing time can be reduced.

Principally, the image forming condition adjustment may be conducted when the developer consumption amount is increased for a given amount compared to the previous image forming condition adjustment timing; when the number of printed sheets becomes a given amount; and/or when a given time period elapses. But, as will be described later, the timing of adjusting the image forming condition may be changed in view of the timing of the exposure time-based density adjustment, in which the image forming condition adjustment may be conducted when the exposure time-based density adjustment is conducted.

Conventionally, the image forming condition adjustment may be conducted by stopping or interrupting a printing operation, by which a completion of print job may be delayed. In an example embodiment, by conducting the image forming condition adjustment when conducting the exposure time-based density adjustment, the total printing time can be reduced.

In an example embodiment, upon receiving the adjustment execution instruction from the adjustment determination unit 208, the adjustment unit 209 conducts the image forming condition adjustment and/or the exposure time-based density adjustment. Specifically, when the image forming condition adjustment is conducted, as similar to the conventional density adjustment, the density adjustment may be conducted using mainly the charge bias controller 202, the development bias controller 205, and the exposing power controller 203.

Further, when the exposure time-based density adjustment is conducted, the density adjustment may be conducted using mainly the exposing time controller 204. Specifically, as shown in FIG. 3, the half-tone pattern may be formed by changing the exposure time with various values, and the density of the half-tone pattern is detected by the detector 117 (FIG. 1) to determine the exposure time for suitable density.

Further, the image forming condition adjustment and exposure time-based density adjustment can be conducted for each of colors separately. Further, when a print job is switched to a printing at a high resolution level but a full color printing is not conducted under the high resolution level, the exposure time-based density adjustment can be conducted only for the color to be used for printing.

Further, the adjustment unit 209 may include a linear interpolation unit. Based on the density of a plurality of patterns measured or detected by the detector 117, the linear interpolation unit can conduct an linear interpolation of density to obtain the density value of image not actually formed and measured, and can determine suitable control values or parameters (exposure time in one pixel, charge bias, development bias, beam power) by referring the density value obtained by the linear interpolation. With such a configuration, the density can be controlled with a higher precision using a relatively limited number of actually formed patterns.

Figure 4:
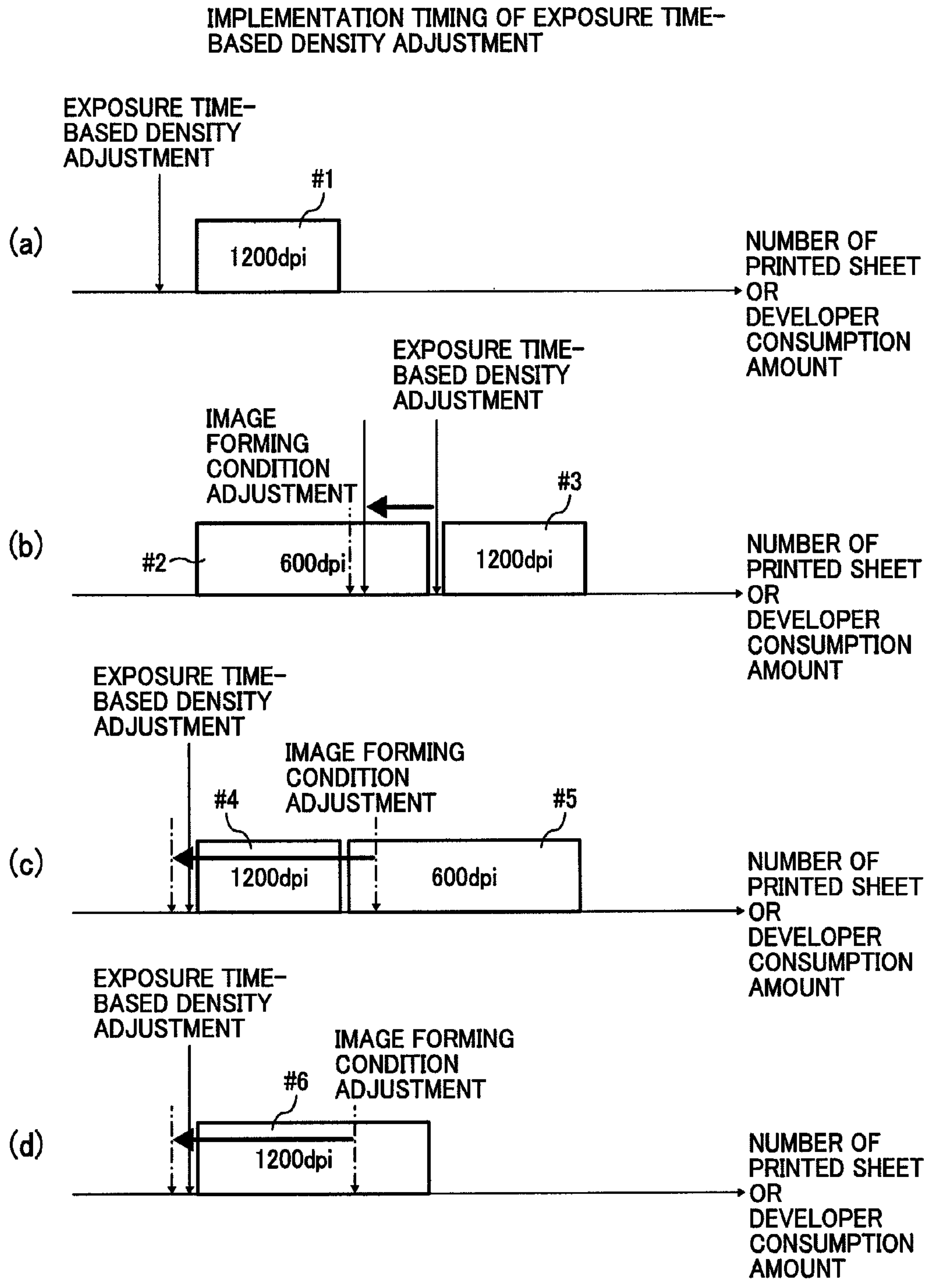
FIGS. 4(*a*), 4(*b*), 4(*c*), and 4(*d*) show implementation timing of exposure time-based density adjustment.

FIG. 4 shows an example implementation or execution timing of the exposure time-based density adjustment. In an example embodiment, the image forming apparatus 1 may use two resolution levels such as a low resolution level of 600 dpi and a high resolution level of 1200 dpi, in which the beam size such as a beam spot diameter of the light beam of image forming apparatus 1 is set for the low resolution level (600 dpi). Further, the horizontal axis of FIG. 4 represents the number of printed sheets or developer consumption amount, which corresponds to the time line.

FIGS. 4(*a*) to 4(*d*) show examples of operation pattern for the exposure time-based density adjustment, and FIGS. 5 to 8 show example of data used for the operation shown in FIGS. 4(*a*) to 4(*d*), respectively. In principle, the exposure time-based density adjustment may be conducted just before the print job is shifted to the high resolution print job when the print job shifts from the low resolution print job to the high resolution print job, so that a print job is not interrupted by the adjustment work.

Further, if the image forming condition adjustment using the normally formed solid pattern and half-tone pattern is to be conducted at a given time span before or after the print job shifts from the low resolution level to the high resolution level, implementation of any one of the exposure time-based density adjustment and image forming condition adjustment may be shifted to a forward timing (earlier timing) to shorten the total printing time, in which the exposure time-based density adjustment may be conducted right after conducting the image forming condition adjustment. The given time span may mean, for example, a time period of to-be-successively-conducted print jobs.

FIG. 4(*a*) shows an example operation when a print job #1 of high resolution level (e.g., 1200 dpi) is to be started when the image forming apparatus is at the low resolution level (e.g., 600 dpi) condition.

Figure 5:
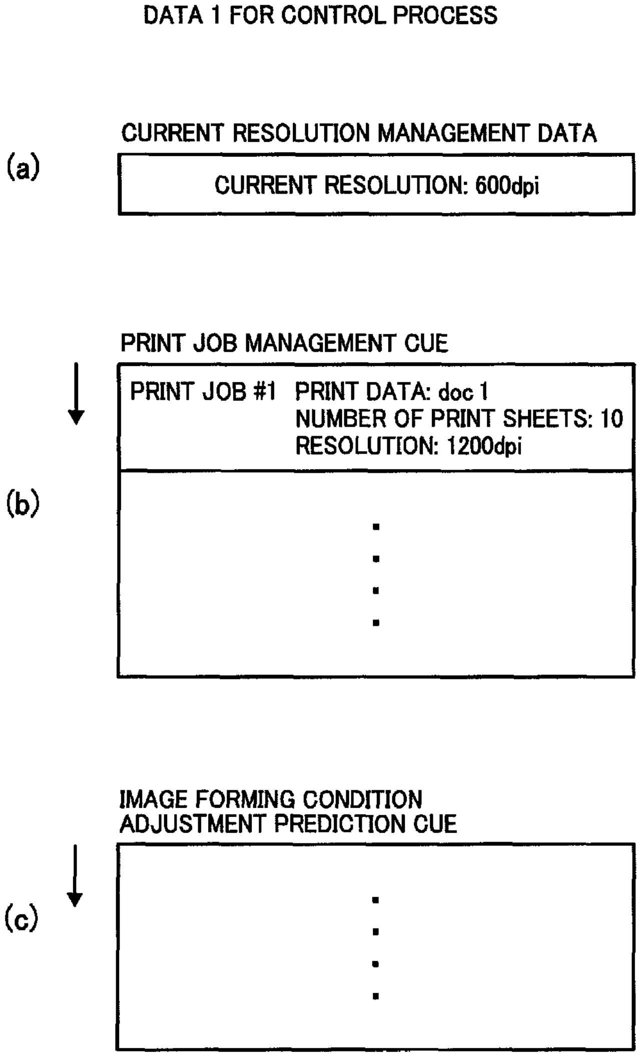
FIGS. 5(*a*), 5(*b*), and 5(*c*) show one example of data used for control process.

In this case, the adjustment determination unit 208 can recognize that the current resolution level is at 600 dpi based on the content of the current resolution management data (FIG. 5(*a*)) managed by the resolution level controller 207, and can recognize that the print job #1 has a resolution level of 1200 dpi based on the content of the print job management cue (FIG. 5(*b*)) managed by the print job controller 206. Therefore, the adjustment determination unit 208 can recognize that a resolution condition is to be switched from the low resolution level to the high resolution level, and the exposure time-based density adjustment is required. Accordingly, the adjustment determination unit 208 instructs the adjustment unit 209 to conduct the exposure time-based density adjustment at a timing just before starting the print job #1, and the adjustment unit 209 conducts the exposure time-based density adjustment.

FIG. 4(*b*) shows an example operation when a print job #2 of low resolution level (e.g., 600 dpi) and a print job #3 of high resolution level (e.g., 1200 dpi) are to be successively conducted, and the image forming condition adjustment may be conducted during the print job #2.

Figure 6:
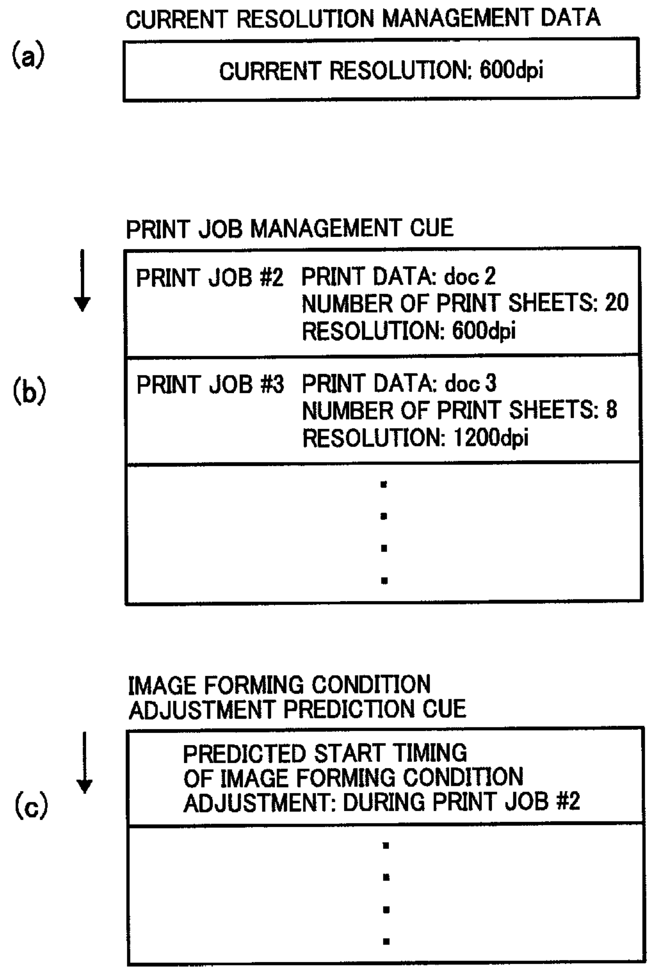
FIGS. 6(*a*), 6(*b*), and 6(*c*) show one example of data used for control process.

In this case, when the adjustment determination unit 208 determines that the image forming condition adjustment is required during the print job #2 based on the content of the print job management cue (FIG. 6(*b*)) managed by the print job controller 206, the adjustment determination unit 208 can recognize that the print job #3 of high resolution level (e.g., 1200 dpi) is to be conducted after the current print job #2 of low resolution level (e.g., 600 dpi), and can recognize that the exposure time-based density adjustment may be required just before the print job #3.

However, it may be inefficient to conduct the exposure time-based density adjustment separately from the current image forming condition adjustment. Therefore, the exposure time-based density adjustment, normally conducted just before the print job #3, may be conducted right after conducting the current image forming condition adjustment. Accordingly, the adjustment determination unit 208 instructs the adjustment unit 209 to successively conduct the image forming condition adjustment and exposure time-based density adjustment during the print job #2, and the adjustment unit 209 conducts the image forming condition adjustment and the exposure time-based density adjustment successively. By successively conducting the image forming condition adjustment and exposure time-based density adjustment as such, the adjustment operation is not required at a time between the print job #2 (600 dpi) and print job #3 (1200 dpi), by which the total printing time can be shortened.

FIG. 4(*c*) shows an example operation when a print job #4 of high resolution level (e.g., 1200 dpi) is to be started from the low resolution level (e.g., 600 dpi) condition, and then a print job #5 of low resolution level (e.g., 600 dpi) is to be successively conducted after the print job #4, in which the image forming condition adjustment may be conducted during the print job #5.

In this case, the adjustment determination unit 208 can recognize that the current resolution level is 600 dpi based on the content of current resolution management data (FIG. 7(*a*)) managed by the resolution level controller 207, and can recognize further that the print job #4 has a resolution level of 1200 dpi based on the content of print job management cue (FIG. 7(*b*)) managed by the print job controller 206. Therefore, the adjustment determination unit 208 can recognize that the operation is to be switched from the low resolution level to the high resolution level, and can recognize that the exposure time-based density adjustment is required. Further, the adjustment determination unit 208 can recognize that the image forming condition adjustment is to be conducted during the print job #5 based on the content of the image forming condition adjustment prediction cue (FIG. 7(*c*)) managed by the adjustment determination unit 208.

However, it may be inefficient to conduct the image forming condition adjustment separately from the current exposure time-based density adjustment. Therefore, the image forming condition adjustment to be conducted during the print job #5 may be shifted just before the current exposure time-based density adjustment as shown in FIG. 4(*c*). Accordingly, the adjustment determination unit 208 instructs the adjustment unit 209 to successively conduct the image forming condition adjustment and exposure time-based density adjustment at a timing just before starting the print job #4, and the adjustment unit 209 conducts the image forming condition adjustment and the exposure time-based density adjustment successively.

FIG. 4(*d*) shows an example operation when a print job #6 of high resolution level (e.g., 1200 dpi) is started, from the low resolution level (e.g., 600 dpi) condition, and then the image forming condition adjustment may be conducted during the print job #6.

Figure 8:
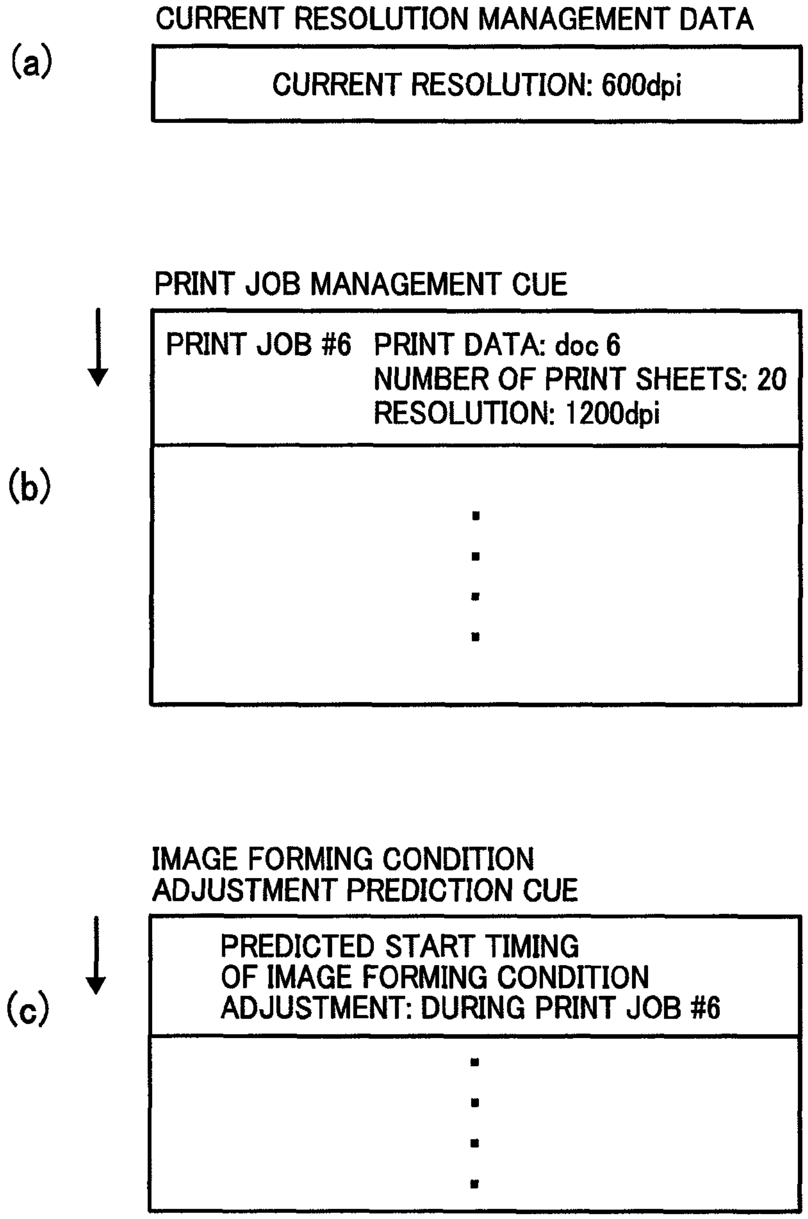
FIGS. 8(*a*), 8(*b*), and 8(*c*) show one example of data used for control process.

In this case, the adjustment determination unit 208 can recognize that the current resolution level is at 600 dpi based on the content of current resolution management data (FIG. 8(*a*)) managed by the resolution level controller 207, and can recognize further that the print job #6 has a resolution level of 1200 dpi based on the content of print job management cue (FIG. 8(*b*)) managed by the print job controller 206, and can recognize that the operation is to be switched from the low resolution level to the high resolution level, and can recognize that the exposure time-based density adjustment is required. Further, the adjustment determination unit 208 can recognize that the image forming condition adjustment is to be conducted during the print job #6 based on the content of the image forming condition adjustment prediction cue (see FIG. 8(*c*)) managed by the adjustment determination unit 208.

However, it may be inefficient to conduct the image forming condition adjustment separately from the current exposure time-based density adjustment. Therefore, the image forming condition adjustment to be conducted during the print job #6 may be shifted just before the current exposure time-based density adjustment. Accordingly, the adjustment determination unit 208 instructs the adjustment unit 209 to successively conduct the image forming condition adjustment and exposure time-based density adjustment at a timing just before starting the print job #6, and the adjustment unit 209 conducts the image forming condition adjustment and the exposure time-based density adjustment successively.

Further, when the image forming operation is to be switched from the low resolution level (e.g., 600 dpi) to the high resolution level (e.g., 1200 dpi), the printing speed or line speed for the high resolution level (e.g., 1200 dpi) may be set to a given value such as for example one half (½) of normal line speed set for the low resolution level (e.g., 600 dpi). Theoretically, the printing can be conducted at the low resolution level and the high resolution level with a same or similar image forming condition, but the exposure time-based density adjustment for high resolution level can be conducted with a higher precision when the line speed is set to a given value compared to the low resolution level. For example, when the image forming operation is to be switched from the low resolution level (e.g., 600 dpi) to the high resolution level (e.g., 1200 dpi), the printing speed or line speed of the high resolution level (e.g., 1200 dpi) may be set to an one half (½) of the printing speed or line speed of the low resolution level (e.g., 600 dpi). Therefore, the one half (½) of the line speed of low resolution level may be set when conducting the exposure time-based density adjustment just before conducting a print job of 1200 dpi shown in FIGS. 4(*a*), 4(*c*), and 4(*d*), and the normal line speed may be set when conducting the density adjustment during a print job of 600 dpi in FIG. 4(*b*).

In the above described example embodiment, the image forming apparatus 1 uses two resolution levels such as a low resolution level (e.g., 600 dpi) and a high resolution level (e.g., 1200 dpi), and sets the reference beam size such as a beam spot diameter for the low resolution level. Further, the image forming apparatus 1 can use three or more resolution levels, and can set the reference beam size for the reference resolution level, which is other than the highest resolution level, in which when the resolution level is shifted from the reference resolution level, corresponding to the reference beam size, to the higher resolution level, the exposure time-based density adjustment may be required.

As above described, in an example embodiment, an image forming apparatus adaptable for a plurality of resolution levels may set the reference beam size such as a beam spot diameter on photoconductor for the low resolution level. When the resolution level is to shift from the low resolution level to the high resolution level (low→high), test patterns used for the density adjustment may be prepared by changing the exposing time per pixel to form half-tone patterns used for the density adjustment, by which the developer consumption can be reduced compared to the conventional density adjustment, and the density adjustment can be conducted within a shorter period of time compared to the conventional density adjustment. Further, when the same developer consumption amount and same time period is used for the density adjustment, the density adjustment control according to an example embodiment can be conducted with a higher precision compared to the conventional density adjustment.

Figure 9:
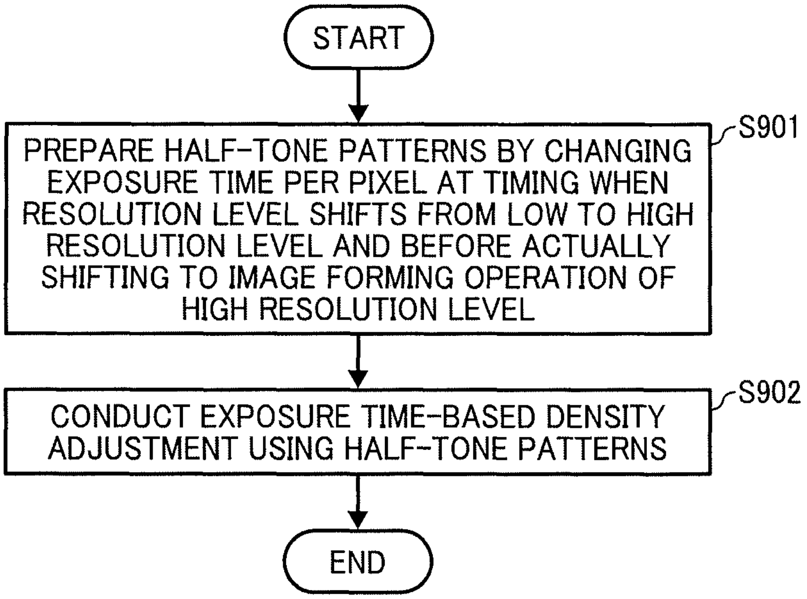
FIG. 9 shows a method of controlling an image forming apparatus.

A description is given of a method of controlling an image forming operation conducted with the image forming apparatus according to an example embodiment with reference to FIG. 9, in which the image forming apparatus can form images at a plurality of resolution levels which includes at least one low resolution level and one high resolution level, and a beam size on a photoconductor is set for the low resolution level. As shown in FIG. 9, at step S901, a plurality of half-tone patterns is prepared by changing an exposure time per pixel at a timing when a resolution level shifts from the low resolution level to the high resolution level and before actually shifting to an image forming operation of the high resolution level. Then, at step S902, an exposure time-based density adjustment using the plurality of half-tone patterns is conducted.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an information processing apparatus or an image processing apparatus using a computer-readable program, which can execute the above-described processes or steps. Further, in the above-described exemplary embodiment, a storage device (or recording medium), which can store computer-readable program, may be a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, hard disk in a server, or the like, but not limited these. Further, a computer-readable program can be downloaded to a particular computer (e.g., personal computer) via a network such as the internet, or a computer-readable program can be installed to a particular computer from the above-mentioned storage device, by which the particular computer may be used for the system or apparatus according to an example embodiment, for example.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image forming apparatus for forming images using a first image forming condition which forms an image with a first resolution level and first line speed, and a second image forming condition which forms an image with a second resolution level and second line speed, the second resolution level being finer than the first resolution level and the second line speed being slower than the first line speed, the image forming apparatus comprising:

a density adjustment unit to conduct a first image forming density adjustment for adjusting an image forming condition and a second density adjustment for adjusting an exposure time per pixel based on a measurement result of a plurality of half-tone patterns, in which each pattern has a different exposure time per pixel, wherein the density adjustment unit conducts the second density adjustment for the second image forming condition before a printing operation shifts from a printing operation using the first image forming condition to a printing operation using the second image forming condition; and wherein when a first density adjustment is scheduled within a given time span before or after the printing operation shifts from a printing operation using the first image forming condition to a printing operation using the second image forming condition, one of the scheduled first density adjustment and second density adjustment is shifted in time such that the second density adjustment occurs after the first density adjustment.

2. The image forming apparatus of claim 1, wherein the density adjustment unit includes an interpolation unit used in the second density adjustment to conduct a linear interpolation for determining a density of an image based on a density of the plurality of half-tone patterns actually measured, and the density adjustment unit determines a suitable control value for the image based on the density determined by the linear interpolation executed by the interpolation unit.

3. The image forming apparatus of claim 1, wherein the second density adjustment is conducted by setting the exposure time per pixel separately for each of multiple different colors.

4. The image forming apparatus of claim 3, wherein when a print job is switched to the second image forming condition and is conducted without using all colors available to the image forming apparatus, the second density adjustment is conducted for only the color used for the second image forming condition.

5. The image forming apparatus of claim 1, wherein the density adjustment unit conducts the second density adjustment immediately prior to shifting to the second image forming condition.

6. The image forming apparatus of claim 5, wherein the density adjustment unit conducts the second density adjustment using a line speed corresponding to the second resolution level after shifting.

7. The image forming apparatus of claim 1, wherein the density adjustment unit conducts the second density adjustment immediately prior to shifting to the second resolution level, and when the first density adjustment is scheduled to be conducted within the given time span before or after shifting from the first resolution level to the second resolution level the second density adjustment is conducted right after the first density adjustment.

8. The image forming apparatus of claim 7, wherein when the density adjustment unit conducts the second density adjustment just before the resolution level shifts to the second resolution level, the density adjustment unit conducts the second density adjustment using a line speed corresponding to the second resolution level after shifting, and when the density adjustment unit conducts the second density adjustment at the first resolution level condition, the density adjustment unit conducts the second density adjustment using a line speed corresponding to the first resolution level.

9. A method of controlling an image forming operation of an image forming apparatus, comprising:

forming images using a first image forming condition which forms an image with a first resolution level and first line speed, forming images using a second image forming condition which forms an image with a second resolution level and second line speed, the second resolution level being finer than the first resolution level and the second line speed being slower than the first line speed, the method further comprising, in response to a shift from the first image forming condition to the second image forming condition;

conducting a first image forming density adjustment for adjusting an image forming condition, and a second density adjustment for adjusting an exposure time per pixel based on the result of measuring a plurality of half-tone patterns, in which each pattern has a different exposure time per pixel, wherein the second density adjustment for the second image forming condition occurs when an image forming operation shifts from the first image forming condition to the second image forming condition; and wherein when a first density adjustment is scheduled within a Oven time span before or after the printing operation shifts from a printing operation using the first image forming condition to a printing operation using the second image forming condition, one of the scheduled first density adjustment and second density adjustment is shifted in time such that the second density adjustment occurs after the first density adjustment.

10. A non-transitory computer-readable medium storing instructions that when executed by a computer cause the computer to execute a method comprising:

forming images using a first image forming condition which forms an image with a first resolution level and first line speed, forming images using a second image forming condition which forms an image with a second resolution level and second line speed, the second resolution level being finer than the first resolution level and the second line speed being slower than the first line speed, the method further comprising, in response to a shift from the first image forming condition to the second image forming condition;

conducting a first image forming density adjustment for adjusting an image forming condition, and a second density adjustment for adjusting an exposure time per pixel based on the result of measuring a plurality of half-tone patterns, in which each pattern has a different exposure time per pixel, wherein the second density adjustment for the second image forming condition occurs when an image forming operation shifts from the first image forming condition to the second image forming condition; and wherein when a first density adjustment is scheduled within a given time span before or after the printing operation shifts from a printing operation using the first image forming condition to a printing operation using the second image forming condition, one of the scheduled first density adjustment and second density adjustment is shifted in time such that the second density adjustment occurs after the first density adjustment.

* * * * *